(12) United States Patent  
Hyun

(10) Patent No.: US 6,398,395 B1  
(45) Date of Patent: Jun. 4, 2002

(54) COMPACT GENERATOR, LIGHT-EMITTING WHEEL HAVING THE SAME, AND MANUFACTURING METHOD THEREFOR

(75) Inventor: Kwang-ik Hyun, Seoul (KR)

(73) Assignee: Teltek Co., Ltd., Seongnam (KR)

( * ) Notice: Subject to any disclaimer, the term of this patent is extended or adjusted under 35 U.S.C. 154(b) by 0 days.

(21) Appl. No.: 09/480,493

(22) Filed: Jan. 11, 2000

(30) Foreign Application Priority Data

Aug. 10, 1999 (KR) ............................................ 99-32822

(51) Int. Cl.[7] ................................................. B60Q 1/26

(52) U.S. Cl. ......................... 362/500; 362/192; 362/800

(58) Field of Search ................................. 362/500, 192, 362/800, 806, 473, 103; 280/11.203; 301/5.3

(56) References Cited

U.S. PATENT DOCUMENTS

| | | | |
|---|---|---|---|
| 1,333,119 A | | 3/1920 | Krag-Möller |
| 1,478,587 A | * | 12/1923 | Stoner ......................... 362/500 |
| 2,505,154 A | | 4/1950 | Smith .......................... 315/78 |
| 2,622,931 A | | 12/1952 | Petrelli et al. ................ 301/5.7 |
| 2,633,387 A | | 3/1953 | Cooke et al. |
| 2,871,061 A | | 1/1959 | Behm et al. |
| 3,789,208 A | | 1/1974 | Lewis .......................... 362/103 |
| 4,114,952 A | | 9/1978 | Kimmell ...................... 301/5.7 |

(List continued on next page.)

FOREIGN PATENT DOCUMENTS

| | | |
|---|---|---|
| TW | 89101797 | 2/2000 |
| WO | PCT/KR00/00281 | 3/2000 |

Primary Examiner—Alan Cariaso  
Assistant Examiner—Peggy A Neil  
(74) Attorney, Agent, or Firm—Reed Smith LLP

(57) ABSTRACT

An improved compact generator, a light-emitting wheel adopting the same and a manufacturing method are provided. To make a generator compact and light to smoothly perform electromagnetic induction by crossing the directions of magnetic flux of an armature coil and a permanent magnet, an assembly structure including an armature arm and the armature coil is improved. To prevent damage by impact to the permanent magnet and use a rare-earth based permanent magnet in a ring type having the thickness of 1.2 mm in Lanthanides which has a magnetic force 9–10 times stronger than that of a ferrite based permanent magnet but is weak against impacts, a permanent magnet assembly is provided in which the permanent magnet is arranged on a buffer. Also, to facilitate a lead wire connection between the generator and a light-emitting device and to prevent damage to a lead wire when a wheel hub is molded which is integrally injection-molded with the armature coil assembly, a hollow protruding lead wire guiding portion for protecting a lead wire is provided at the armature coil assembly. As a result, the generator becomes more compact, lighter, and can be reliably and efficiently manufactured in a wheel, that is, mass production is improved and the wheel can be easily replaced. Also, the size of the improved generator is minimized so as to be installed at the wheel of a roller skate. As the light-emitting device emits light by color by the current induced by a rotational force of the wheel, a user can easily identify one's position in a dark place, reducing possibility of accidents and concurrently providing interest to the user and other viewers. Further, the light-emitting wheel is simply manufactured by installing light-emitting devices on a metal circuit plate by an automated robot before or after an additional metal circuit plate is installed at a wheel hub and inserting the metal circuit plate in the wheel hub. Thus, manpower needed for a light-emitting device welding process can be reduced, a wheel assembly process is simplified, and the connection between the generator and the light-emitting device is made easy, lowering the defective rate and improving mass production. Also, when an expensive rare-earth based magnet is used, the thickness of the magnet can be decreased by fixing the permanent magnet using the buffer, which increases the economic value thereof.

31 Claims, 13 Drawing Sheets

U.S. PATENT DOCUMENTS

| | | | |
|---|---|---|---|
| 4,191,988 A | | 3/1980 | Kumakura .................. 362/473 |
| 4,298,910 A | * | 11/1981 | Price .......................... 362/806 |
| 4,363,502 A | | 12/1982 | Bakerman .................. 362/103 |
| 4,367,515 A | | 1/1983 | Beard ......................... 362/103 |
| 4,429,232 A | | 1/1984 | Thomas et al. ............... 290/44 |
| 4,648,610 A | | 3/1987 | Hegyi ......................... 362/192 |
| 4,725,928 A | * | 2/1988 | Strepek ...................... 362/500 |
| 4,775,919 A | | 10/1988 | Pearsall et al. ............. 362/500 |
| 4,782,431 A | | 11/1988 | Park ........................... 362/192 |
| 5,271,633 A | | 12/1993 | Hill, Jr. ...................... 280/809 |
| 5,278,733 A | | 1/1994 | St. Thomas ................ 362/500 |
| 5,294,188 A | | 3/1994 | Vancil, Jr. ................... 362/500 |
| 5,390,941 A | | 2/1995 | Pozzobon et al. ............ 279/62 |
| 5,456,478 A | | 10/1995 | Hsu et al. ................... 362/192 |
| 5,475,572 A | * | 12/1995 | Tseng ......................... 362/802 |
| 5,536,026 A | | 7/1996 | Pozzobon et al. .......... 362/500 |
| 5,536,074 A | * | 7/1996 | Hsu et al. ................... 362/500 |
| 5,552,972 A | * | 9/1996 | Rezvani ...................... 362/500 |
| 5,580,092 A | | 12/1996 | Hsu et al. ................... 362/500 |
| 5,580,093 A | * | 12/1996 | Conway ..................... 362/500 |
| 5,592,030 A | | 1/1997 | Adahan ....................... 307/80 |
| 5,649,716 A | | 7/1997 | Zhang ..................... 280/11.19 |
| 5,718,499 A | | 2/1998 | De Caro ..................... 362/464 |
| 5,810,450 A | | 9/1998 | Tsu et al. .................... 362/500 |
| 5,873,600 A | | 2/1999 | Conway ..................... 280/816 |
| 6,070,997 A | * | 6/2000 | Duke et al. ................. 362/500 |

* cited by examiner

COMPACT GENERATOR, LIGHT-EMITTING WHEEL HAVING THE SAME, AND MANUFACTURING METHOD THEREFOR

BACKGROUND OF THE INVENTION

1. Field of the Invention

The present invention relates to an improved compact generator, a light-emitting wheel having the same, and a manufacturing method of the light-emitting wheel, and more particularly, to an improved compact generator, a light-emitting wheel having the same, and a method of manufacturing the light-emitting wheel, exhibiting compatibility without being limited to the diameter with respect to the existing axle so that electromagnetic induction is more efficiently performed compared to a conventional generator, mechanical stability and movability of a wheel structure which are very important points in a wheel are not lowered, even if a generator is included, as the structure thereof becomes simplified, and simultaneously, the efficiency in manufacturing the light-emitting wheel, that is, mass production thereof, is increased, and a user can easily replace the wheel.

2. Description of the Related Art

Various types of conventional technologies relating to a roller skate wheel adopting a light-emitting mechanism have been suggested.

U.S. Pat. No. 4,298,910 discloses a roller skate wheel with a self-contained generator in which a permanent magnet is secured to an inner stationary body and electromagnetic induction coils are provided at an outer rotatable body. When the outer rotatable body rotates via bearings, current is induced by electromagnetic induction generated between the electromagnetic induction coils in the outer rotatable body and the permanent magnet in the inner stationary body so that light-emitting diodes installed in the outer rotatable body are energized.

However, in the structure of the above roller stake wheel, the electromagnetic induction mechanism is not compact. Also, as there is no armature arm, the direction of the magnetic field of the permanent magnet is not electromagnetically coupled to the direction of electromagnetic induction coils so that electromagnetic induction is not smoothly generated. Further, as the rotating armature coil is installed outside a hub, the structure of the wheel becomes substantially weakened and the permanent magnet is easily damaged by the impacts received while the wheel actually runs.

Furthermore, as the processes of installing the light-emitting diodes in the wheel and connecting the armature coil and the light-emitting diodes are manually performed, mass production of the roller skate wheel is difficult.

Meanwhile, as another prior art, U.S. Pat. No. 5,580,093 discloses that a light-emitting mechanism is provided at the wheel of an in-line roller skate. However, the electromagnetic induction mechanism is not compact and, although there is an armature arm, as the direction of a permanent magnet and the direction of an armature coil form a parallel structure, not a perpendicular structure, the length of an armature arm is increased so that electromagnetic induction becomes weak. Also, as there is no apparatus for protecting the permanent magnet from being damaged by the impacts generated during actual running, a rare-earth based permanent magnet such as neodymium (Nd) or samarium (Sm) of Lanthanides in the periodic table of the elements, which has a strong magnetic force but weak against impacts, is not used as it is easily broken, and a ferrite based permanent magnet which exhibits a relatively strong impact resistance is used so that the efficiency of the generator is lowered and the size and weight of the generator increases. Further, as the connection between the armature coil and the light emitting devices is not easy, there is a problem in mass production.

Also, in U.S. Pat. No. 5,810,450 as another prior art, although a structure of an armature coil rotating around a permanent magnet is adopted, as there is no damage protection device for the permanent magnet from impact occurring while running as in the above-described prior art, a rare-earth based permanent magnet such as neodymium (Nd) or samarium (Sm) of Lanthanides in the periodic table of the elements is easily broken during use. Accordingly, a ferrite based permanent magnet exhibiting a relatively strong impact resistance is used so that the efficiency of the generator is lowered, the size and weight of the generator increases, and alos brightness in light emission is lowered and mechanical stability and movability of a wheel itself are lowered. Further, as the connection between the armature coil and the light emitting devices is not easy, there is a problem in mass production. Also, as a wheel hub maintaining the inside of the wheel cannot be injection-molded in a body and two half wheel hubs are assembled using an adhesive, costs for assembly increase much while durability of the wheel is lowered.

SUMMARY OF THE INVENTION

To solve the above problems, it is an objective of the present invention to provide an improved compact generator having a super compact structure so that electromagnetic induction is efficiently performed, durability is improved, and mass production is possible.

It is another objective of the present invention to provide a light-emitting wheel having the improved compact generator having a super compact structure so that electromagnetic induction is smoothly performed, durability is improved, and mass production is possible.

It is another objective of the present invention to provide a light-emitting wheel having the improved compact generator in which the structure of the permanent magnet assembly and the armature coil assembly forming the generator is improved so that mechanical endurance, stability and movability, and commercial economic value and productivity are improved.

It is another objective of the present invention to provide a light-emitting wheel having the improved compact generator in which a light-emitting device installation circuit board is used for facilitating installation of the light-emitting devices and other circuit devices needed for efficient light emission, and also the connection to the armature coil is made easy to improve mass production.

It is another objective of the present invention to provide a method of manufacturing a light-emitting wheel by which, when a wheel hub incorporated with an armature coil assembly having the structure for facilitating electromagnetic induction is injection-molded, a lead wire can be extended to an additional light-emitting device installation circuit board without damage, and a process of transmitting the generated current to the light-emitting device using the additional light-emitting device installation circuit board is simplified, thus improving mass production.

Accordingly, to achieve the first objective, there is provided an improved generator for generating electricity according to the rotation of a wheel, the generator, which comprises a ring type permanent magnet assembly encompassing a buffer fixedly encompassing a bearing spacer installed on a stationary wheel axle, in which a permanent magnet is fixed and the poles of the magnet are alternately arranged in a circumferential direction, a rotatable ring type armature coil assembly which rotates while coaxially encompassing the permanent magnet assembly in a non-contact state so that electromagnetic induction is generated in an armature coil by an armature arm alternately magnetized by the poles alternately arranged on the permanent magnet assembly, and where a lead wire protrudes and is guided to be connected to the outside, bearings, installed at both sides of the armature coil assembly and supported by the wheel axle and the bearing spacer, including a stationary bearing portion which is not allowed to rotate during rotation of the armature coil assembly and a rotary bearing portion which rotates when the armature coil assembly rotates, and a hub assembly in which the permanent magnet assembly is fixedly inserted around the bearing spacer on the wheel axle and the armature coil assembly fixedly molded together when a hub is injection-molded is supported by the bearings, forming a rotatable body.

To achieve the second and third objectives, there is provided a light-emitting wheel having an electromagnetic induction mechanism for operating a light-emitting device during rotation of a wheel, which comprises a generator assembly having a ring type permanent magnet assembly fixed by a buffer fixed to a bearing spacer, the poles of the magnet are alternately arranged in a radial direction, a ring type armature coil assembly rotating while encompassing the permanent magnet assembly fixed to the bearing spacer in a non-contact state so that electromagnetic induction is generated in an armature coil by an armature arm alternately magnetized by the poles alternately arranged on the permanent magnet assembly, where a lead wire protrudes and is guided to be connected to the outside, bearings coupled to the buffer and the bearing spacer supported by an inner race of the bearing which is a stationary bearing portion to prevent the permanent magnet assembly from rotating when the armature coil assembly rotates, a light-emitting device installation circuit board on which one or more light-emitting devices are installed and simultaneously a circuit for allowing the light-emitting devices to efficiently emit light as necessary to which a lead wire coil from the armature coil assembly integrally formed with the wheel hub is connected, and a wheel hub assembly having an inner frame portion having a plurality of frames and supported by an outer race of the bearings in which the generator assembly is inserted, and an outer frame portion extended from the inner frame portion and substantially included in the wheel of a transparent material along with the light-emitting device installation circuit board, in which the inner frame and the outer frame are fixedly molded together with the armature coil assembly during injection-molding the wheel hub.

It is preferable in the present invention that said permanent magnet and buffer comprises a buffer, supported at an inner race of the bearings, having an inner diameter so that wheel axles of various diameters can be smoothly inserted to secure compatibility with respect to the wheel axles of various diameters, fixed to said bearing spacer partially having a step inserted into a part of the inner hole (a bearing inner diameter portion) through which the axle passes in the bearings, and having a plurality of buffer wings protruding around the circumference thereof for absorbing impacts applied to said permanent magnet during running of said wheel, and a ring type multi-pole permanent magnet fixed to the buffer in which the poles of the magnet are alternately arranged in a radial direction.

It is preferable in the present invention that the ring type armature coil assembly comprises an armature coil spool onto which the armature coil is wound, a first half cover in which the armature arms are disposed to protrude at predetermined intervals perpendicular to a surface of the cover, and a second half cover, encompassing the armature coil spool by being coupled to the upper portion of the first half cover, in which the armature arms are disposed to protrude to alternate with the armature arms of the first half cover, perpendicular to a surface of the cover, in which, during rotation, polarity induced to the armature arm of the first half cover and that induced to the armature arm of the second half cover by the alternately arranged poles of the permanent magnet are changed alternately so that current is generated in the armature coil.

It is preferable in the present invention that the armature coil spool of the armature coil assembly comprises a protruding guide pipe having a groove for guiding an armature coil lead wire to the outside through a hole formed at the upper portion of the first half cover, and a hub and an armature coil assembly are integrally injection-molded, so that the armature coil lead wire can be prevented from being damaged when the armature coil and the hub are injection-molded and the armature coil lead wire can be easily connected to the light-emitting device.

It is preferable in the present invention that the light-emitting device installation circuit board is formed of a thin circular, semicircular, quadrantal circular, or smaller conductive plate and a plurality of light-emitting devices and electronic circuit elements as necessary are installed at predetermined intervals along the circumference thereof, so that all light-emitting devices are connected by connecting the armature coil lead wire of the armature coil lead wire to only a single light-emitting device.

It is preferable in the present invention that the light-emitting device is a light-emitting diode or a bulb LED chip mounted on a surface of the conductive plate, and that the light-emitting wheel further comprises a transparent bulb protection cap if the light-emitting diode is of a bulb type.

The light-emitting wheel according to the present invention has a flexible structure coupled with the frame of a roller skate by a coupling bolt of a rod-shaped structure having a diameter and length suitable for roller skates, in-line roller skates, skate boards or bound skates so that axles of different lengths and diameters, which are made by various manufactures of skates, can fit well.

To achieve the fourth objective, there is provided a method of manufacturing a light-emitting wheel having a light-emitting mechanism in which power is self-generated by rotation of wheels, which comprises the steps of forming a permanent magnet assembly by encompassing a buffer with a permanent magnet, the buffer having buffer wings for preventing impact to the permanent magnet, forming an armature coil assembly, in which armature arms alternately protrude from covers encompassing a spool where an armature coil is installed, having a protruding guide pipe for guiding the armature coil to the outside, injection-molding a hub in which the armature coil assembly is molded by inserting the armature coil assembly when a wheel hub is injection molded installing a thin conductive plate on which light-emitting devices are installed at an outer frame of the wheel hub, connecting a lead wire coil from the armature coil assembly to any one of the light-emitting devices, forming a urethane mold to be fixed to the outer frame of the wheel hub, forming a wheel by inserting the wheel hub in a mold in which a urethane tire is injection-manufactured and fixed to the outer frame of the wheel hub by injecting thermosetting transparent liquid polyurethane resin therein, separating the mold when the polyurethane is cured, assembling a wheel by fitting a bearing and a bushing in the bearing spacer protruding through one side of the wheel hub, and completing the assembly of a wheel by fitting a bearing and a bushing in the bearing spacer protruding with the permanent magnet assembly in the wheel through the other side of the wheel hub.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
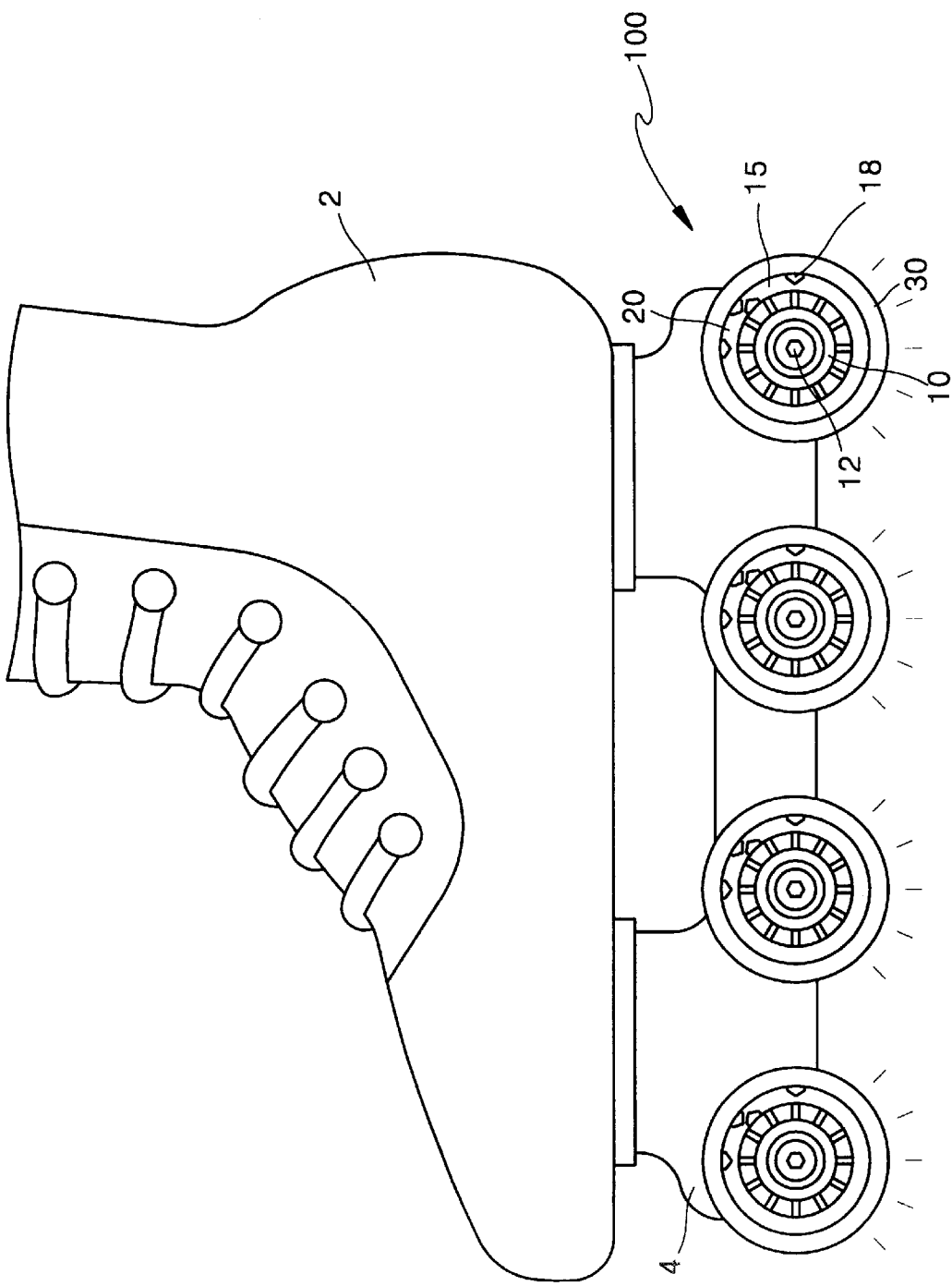
FIG. 1 is a side view showing a roller skate having roller skate wheels adopting a generator according to a preferred embodiment of the present invention.

In the description of the present invention with reference to the attached drawings, the elements having the same functions are given the same or similar reference numerals for convenience'sake.

Referring to FIG. 1, in a roller skate according to a preferred embodiment of the present invention, a wheel installation frame 4 is provided at the lower portion of a roller skate boot 2. Although one side of the wheel installation frame 4, at which the wheels 100 of the present invention are installed, is shown in FIG. 1, the frame is provided from both sides and the wheels 100 are inserted and supported between the frames. The wheels 100 are rotatably installed at the wheel installation frame 4 via a wheel axle 12. The present invention is characteristic in that light-emitting devices 18 emit light when the wheels 100 are rotated. Also, a wheel tire 30 is formed of a transparent thermosetting material such as polyurethane so that the light emission can be seen from the lateral side as well as the rear side of the wheels. The light-emitting devices installed on a light-emitting device installation circuit board 15, which is formed of a thin conductive plate, are installed on an outer frame of a wheel hub 20 disposed in the wheel tire 30 of a polyurethane material. In an inner frame of the wheel hub 20, as shown in the drawing, openings are radially arranged in the shape of a typical wheel to make the hub have a strong structure.

Although not shown in detail in FIG. 1, any structure capable of generating electromagnetic induction between a permanent magnet and an armature coil in an assembly can be adopted as an assembly 10 of the light-emitting wheel and the wheel axle according to the present invention. In the present preferred embodiment, in order to achieve efficient electromagnetic induction, the structures of an assembly of the armature arm and the armature coil and a permanent magnet assembly are improved. Also, although FIG. 1 shows an in-line roller skate, the present invention is not limited to the in-line roller skate, but can also be applied to a two-line, or a four-wheel roller skate, or a bound skate. Further, the present invention can be applied to a rotary wheel type body installed at the bottom of a skate board needing the effect of light emission.

The operations and functions of the improved generator and the roller skate wheel having the same according to the preferred embodiment of the present invention, will now be described with reference to the attached drawings.

Figure 2A:
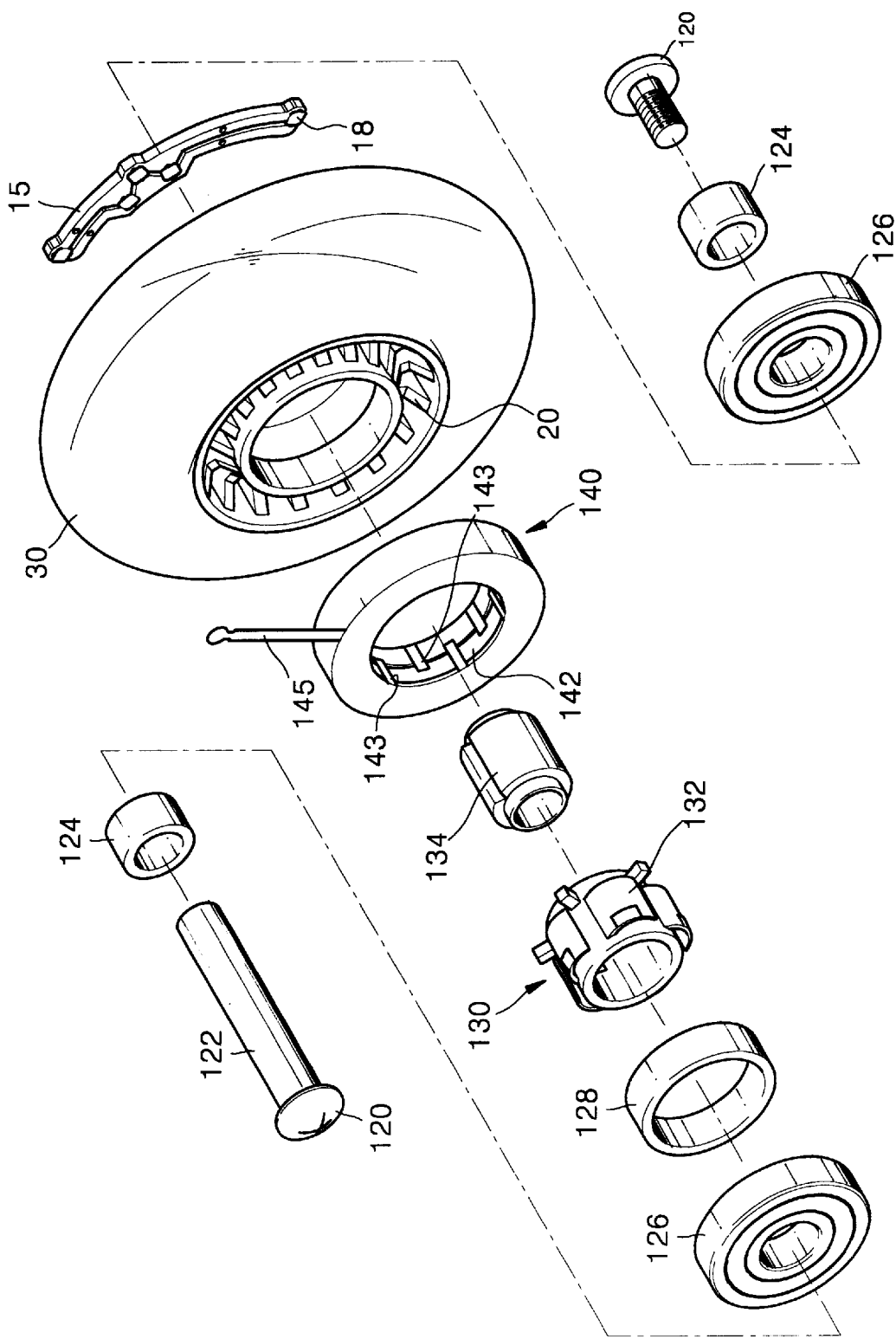
FIG. 2A is an exploded perspective view showing a state in which the roller skate wheel according to a preferred embodiment of the present invention is disassembled.
Figure 2B:
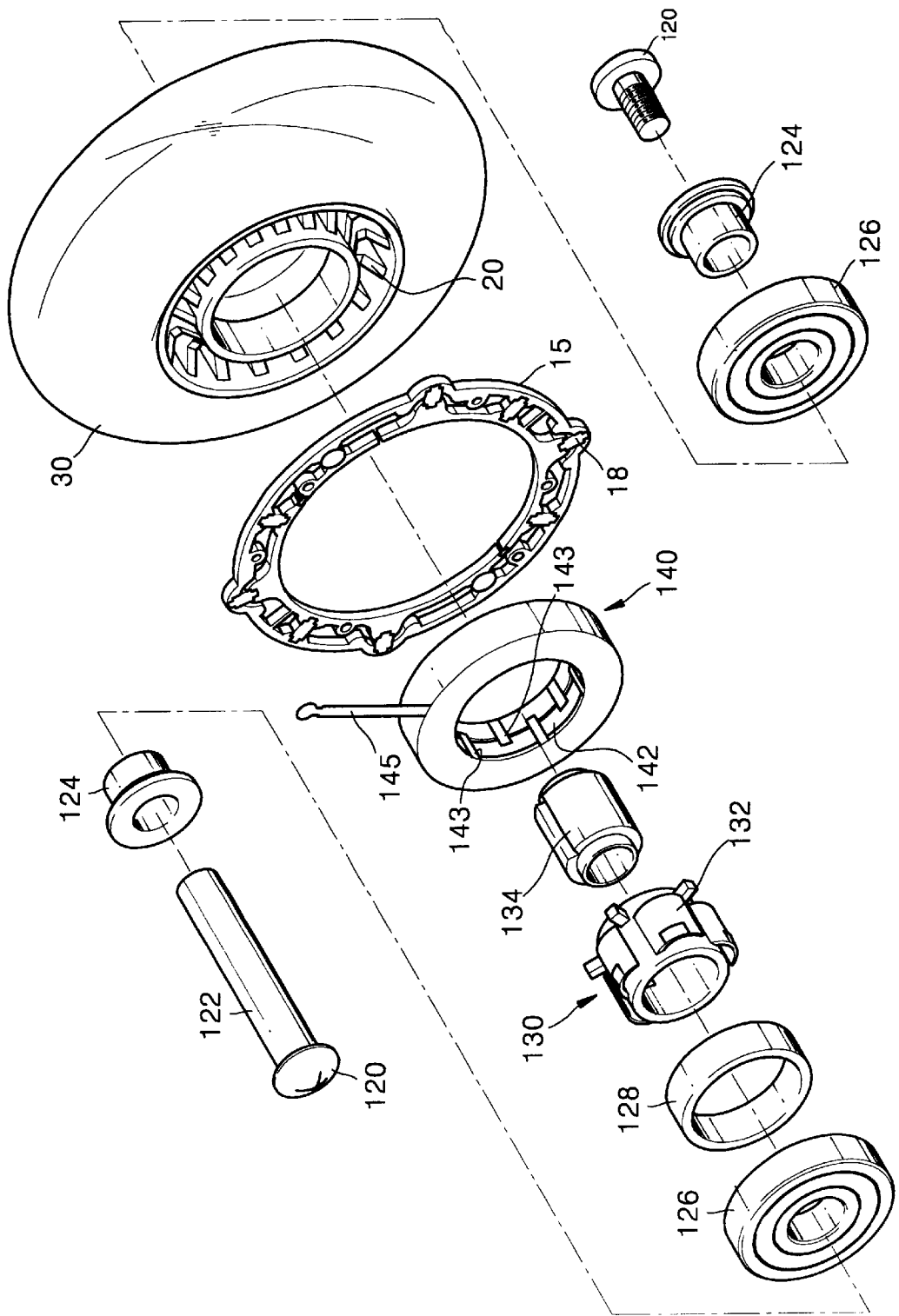
FIG. 2B is an exploded perspective view showing a state in which the roller skate wheel according to another preferred embodiment of the present invention is disassembled.
Figure 3A:
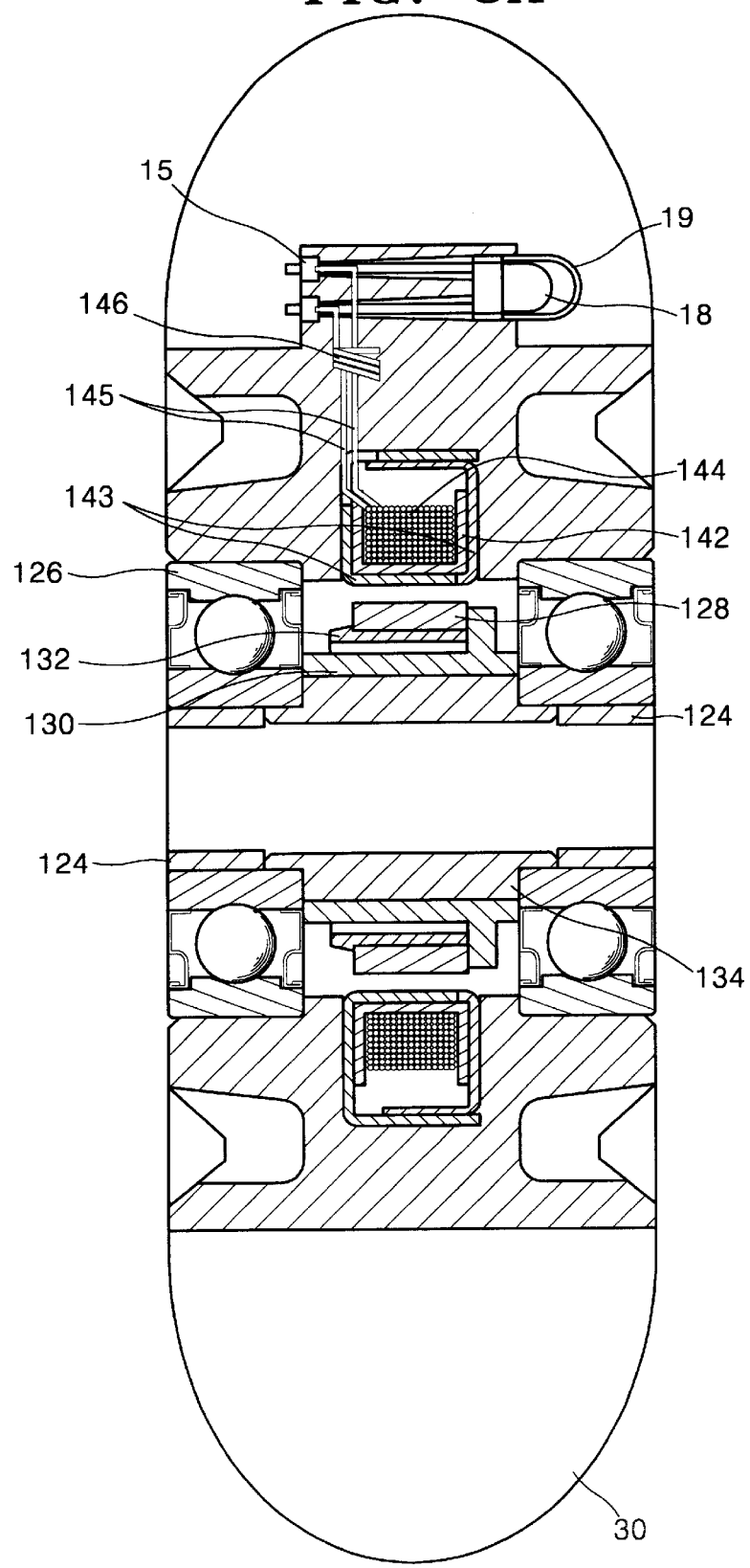
FIG. 3A is a side sectional view showing a state in which the roller skate wheel shown in FIG. 2A is assembled.
Figure 3B:
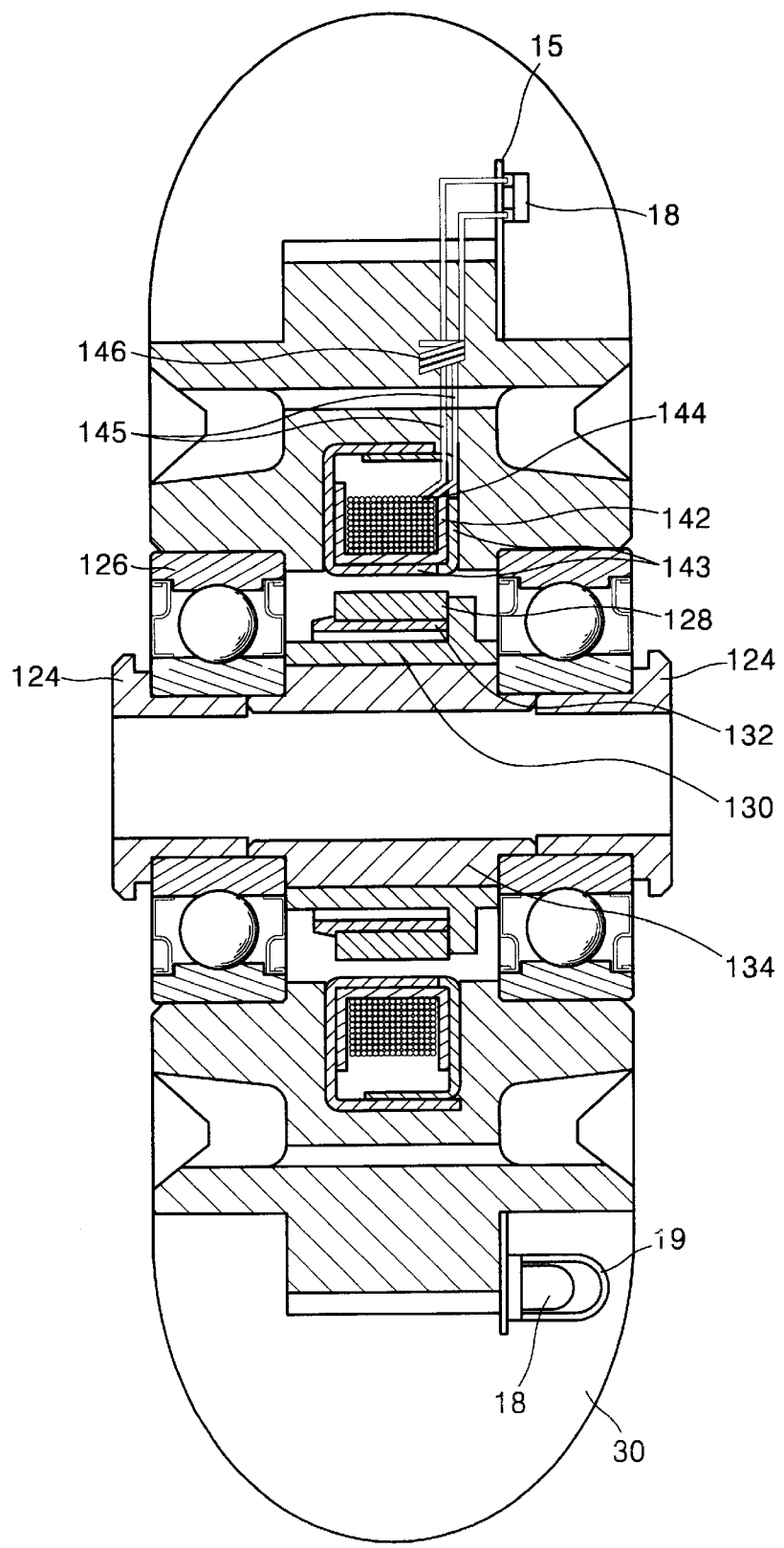
FIG. 3B is a side sectional view showing a state in which the roller skate wheel shown in FIG. 2B is assembled.
Figure 4A:
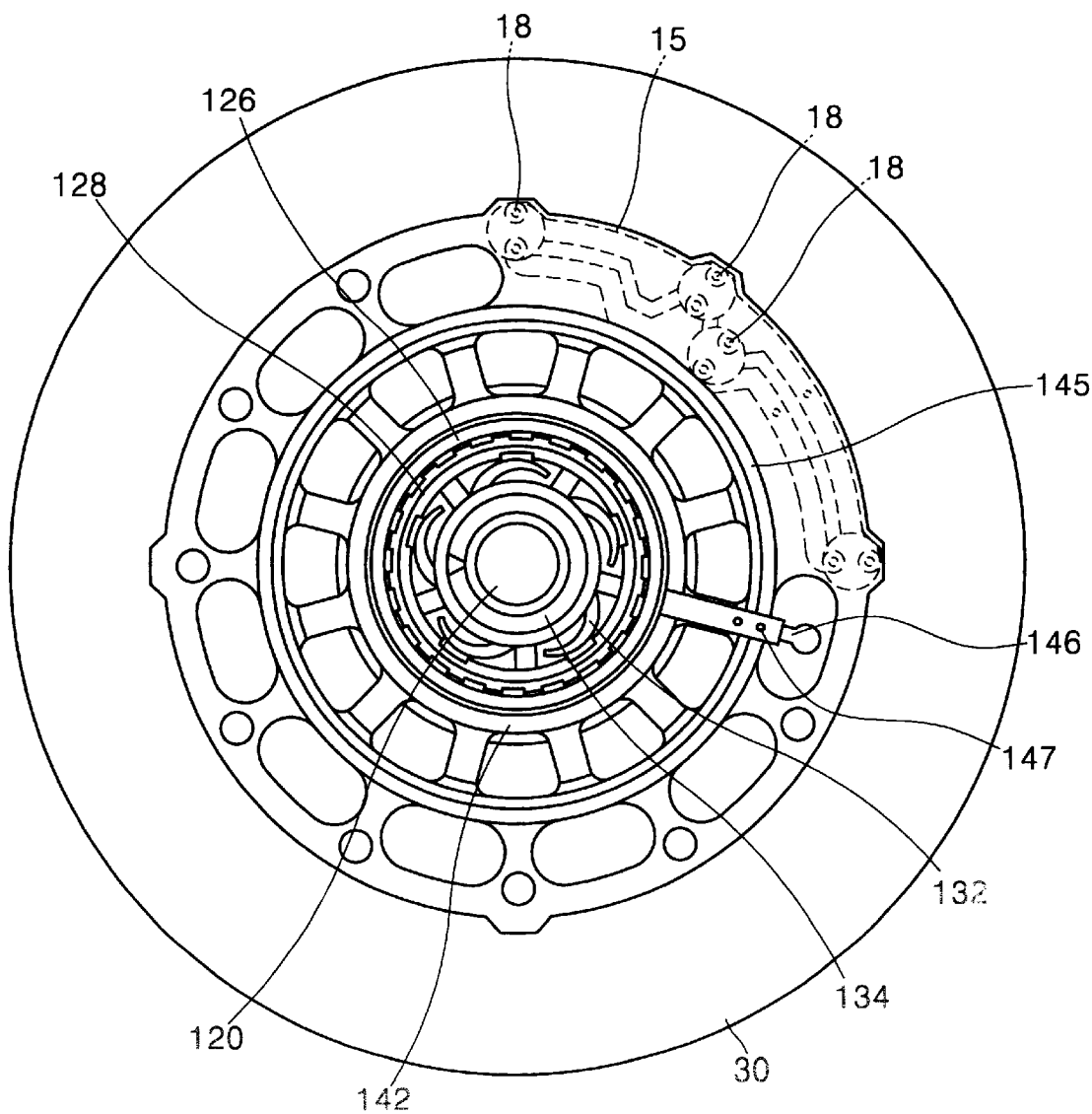
FIG. 4A is a front sectional view showing a state in which the roller skate wheel shown in FIG. 2A is assembled.
Figure 4B:
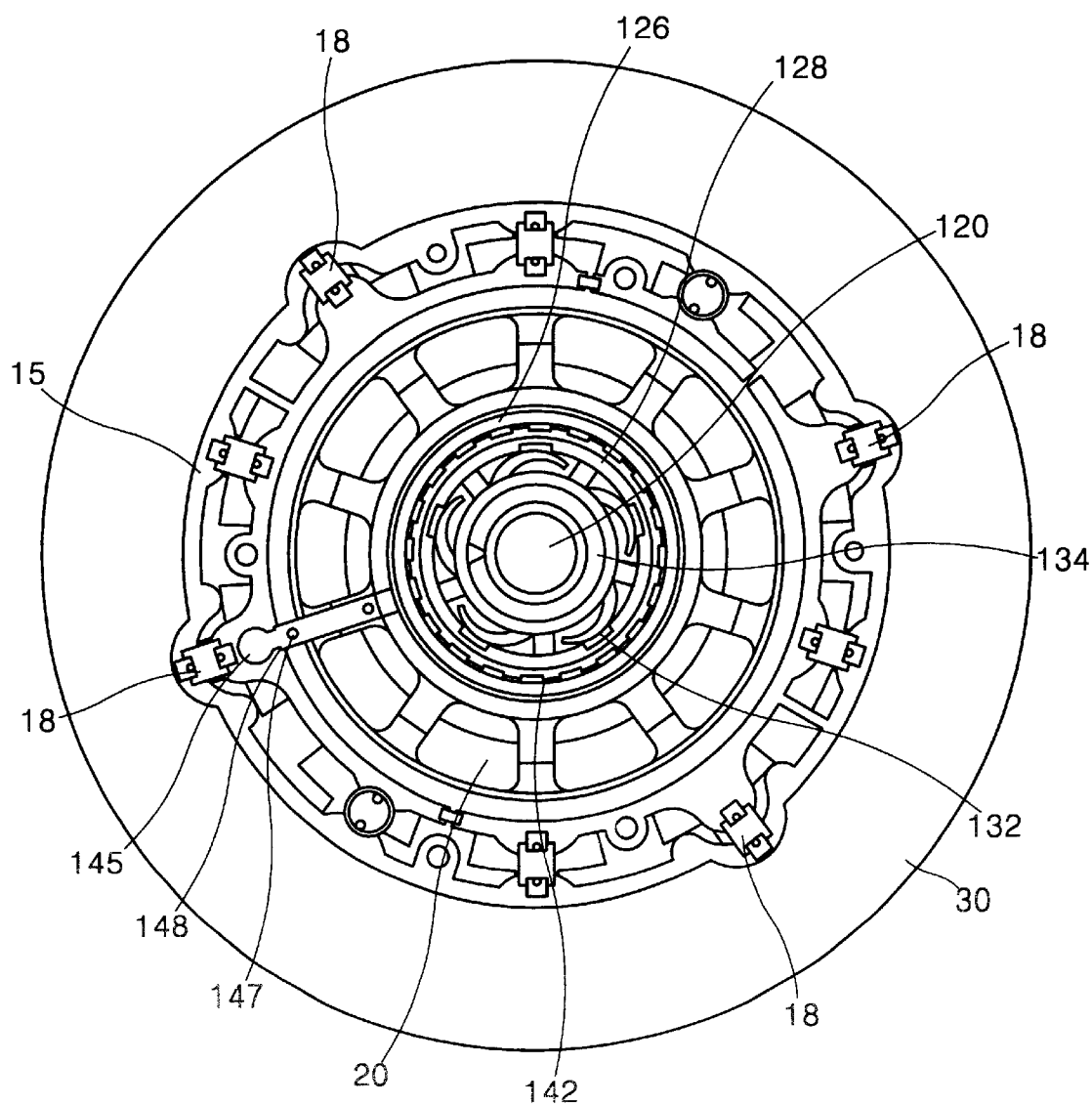
FIG. 4B is a front sectional view showing a state in which the roller skate wheel shown in FIG. 2B is assembled.

FIGS. 2A and 2B are exploded perspective views showing a state in which the roller skate wheels according to preferred embodiments of the present invention are disassembled. Here, for the convenience of explanation, FIGS. 2A and 2B show a state in which both sides of the wheel are disassembled with respect to a polyurethane wheel tire with the wheel hub 20 being assembled. FIGS. 3A and 3B are side sectional views showing the state in which the roller skate wheels shown in FIGS. 2A and 2B are assembled; and FIGS. 4A and 4B are front sectional views showing the state in which the roller skate wheels shown in FIGS. 2A and 2B are assembled.

As shown in FIGS. 2A through 4B, a permanent magnet assembly (128 and 130) and bearings 126 are inserted around a bearing spacer 134 and bushings 124 suitable for the diameter of each axle are inserted around a wheel axle 122. The permanent magnet assembly includes a permanent magnet 128 and a buffer 130 encompassing the permanent magnet 128. Buffer wings 132 are formed on a surface of the buffer 130 to absorb impacts to the permanent magnet 128. An armature coil spool 142 having an armature coil 144 is formed at an armature coil assembly 140. In the armature coil assembly 140, covers formed of metal exhibiting superior magnetization alternating capability are formed to encompass the armature coil spool 142. Armature arms 143 perpendicularly protrude from a surface of each cover and the armature arms of each of the covers are arranged alternately. Accordingly, each armature coil is alternately magnetized by different poles of the permanent magnet and magnetic flux flows perpendicular to the direction of coil windings. Thus, current is induced to the armature coil in the spool due to the electromagnetic induction. The armature coil assembly 140 is fixedly molded with the wheel hub 20 when the wheel hub 20 is injection-molded.

Also, a protruding lead wire guiding portion 145 for guiding a lead wire of the armature coil 144 to the outside is formed on the armature coil assembly 140. Thus, the lead wire is prevented from being damaged when the hub is injection-molded and the lead wire can be easily connected to the light-emitting devices 18. As there is a constricted portion 146 at the outer portion of the protruding lead wire guiding portion 145, a lead wire, which is as long as needed, can be wound about the constricted portion 146 prior to when the wires are connected.

Also, the bearings 126 are inserted from both sides of the armature coil assembly 140. The bearings 126 can support the bearing spacer 134, the wheel axle 122 and a main body of the wheel hub 20 so that, when the wheel is rotated, only the armature coil assembly 140 is rotated while the permanent magnet assembly is not rotated. As the bushings 124 are inserted in the bearings 126 so that a fixed portion of the bearings fixes the wheel axle, as well as the bearing spacer 134. The inner diameter of the bushing varies according to the diameter and length of different wheel axles of roller skates (or in-line skates and skate boards). In the present invention, when the axle is bolted regardless of the diameter of the axle or wheel, to automatically fix the permanent magnet assembly, the side surface of the bearing spacer accurately and closely contacts the inner race of the bearings. Also, as the length of the bearing spacer is slightly greater than that of the permanent magnet assembly, the permanent magnet assembly does not contact the bearings. To allow the light-emitting wheel according to the present invention to have the compatibility with the wheel axles of the existing general products, the inner diameter of the bearing spacer has a sufficiently large size. The bearing spacer partially has a step at both sides, inserted into the inner hole through which the axle passes, that is, a part of bearing inner diameter portion, in the bearings. Also, the buffer has a protrusion portion which is inserted into the groove of the bearing spacer to be encompassed and fixed thereto.

The wheel axle 122 is a hollow cylindric shape and the inner surface is threaded so that bolts 120 are screw-coupled at both ends or one end. Accordingly, the bearing spacer 134 is fixed by closely contacting the inner races of the bearings 126, and the buffer 130, and the permanent magnet assembly (128 and 130) are fixedly disposed and concurrently the wheel axle 122 is fixed to the wheel installation frame 4 (see FIG. 1). Thus, when the roller skate wheel is rotated, the permanent magnet assembly is fixed while only the armature coil assembly 140 including the wheel hub 20 is rotated. Also, although shown in the drawing to be exposed to the outside of the wheel hub 20, the light-emitting device installation circuit board 15 is built in the wheel tire 30 by being installed at an outer frame of the wheel hub 20. The light-emitting installation circuit board 15 has a structure of a thin conductive quarter arc plate as shown in FIG. 2A or a thin conductive ring plate as shown in FIG. 2B. Also, the light-emitting installation circuit board 15 can have a semicircular, quadrantal, or smaller structure. The light-emitting installation circuit board 15 can be installed at the rear side of the armature coil assembly 140 as shown in FIG. 2A, or at the front side of the armature coil assembly 140 a shown in FIG. 2B. In the case in which the light-emitting device installation circuit board 15 is installed at the rear surface of the armature coil assembly 140 as shown in FIGS. 2A and 4A, a terminal of a bulb type LED penetrates the wheel hub 20 to be connected to the light-emitting device installation circuit board 15 so that light can be smoothly emitted from the LED. In the case in which the light-emitting device installation circuit board 15 is installed at the front side as shown in FIG. 2B, circuit elements and light-emitting devices needed for light emission, that is, light-emitting diodes 18 in the present embodiment (see FIG. 4B), or bulb type LEDs, are installed along the circumferential surface of the conductive plate at predetermined intervals on the light-emitting device installation circuit board 15. Although the number of light-emitting devices can be appropriately designed as necessary, one to eight light-emitting devices are normally installed. Four light-emitting devices are shown in FIG. 1 while six light-emitting devices are shown in other drawings.

Figure 5A:
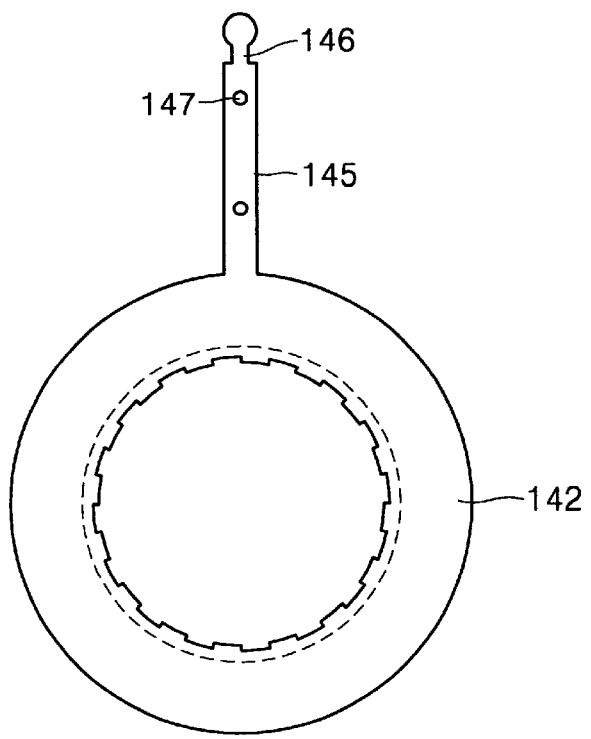
FIGS. 5A and 5B are a front view and a side view, respectively, showing the structure of a spool of an armature coil.
Figure 7A:
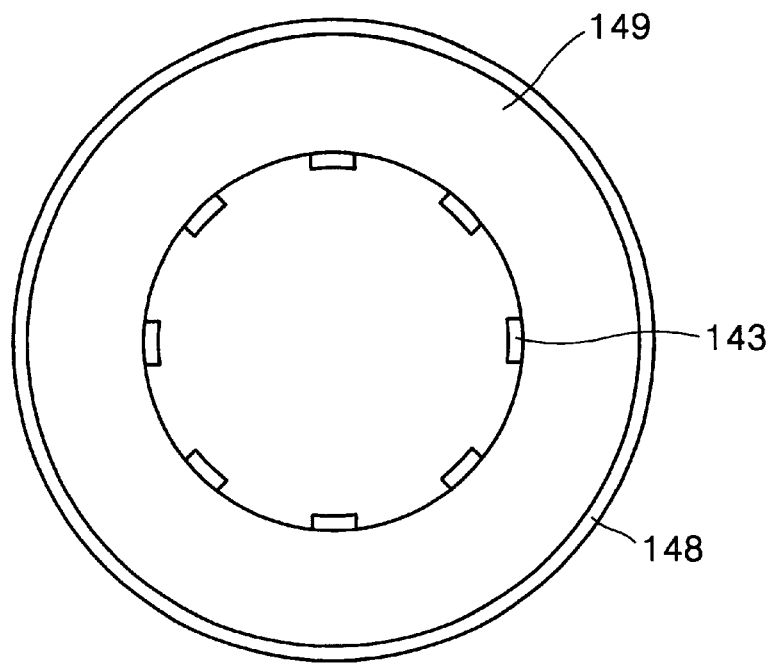
FIGS. 7A and 7B are a front view and a side view, respectively, showing the other part of the armature arm.
Figure 7B:
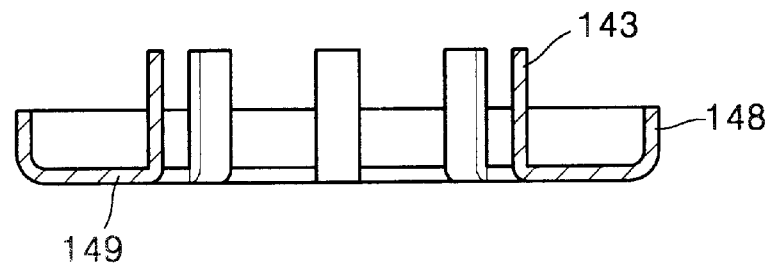

In FIGS. 5A through 7B, elements of the armature coil assembly 140 applied to the present invention are shown. FIGS. 5A and 5B are a front view and a side view showing the structure of a spool of the armature coil, respectively; FIGS. 6A and 6B are a front view and a side view showing part of the armature arm, respectively; and FIGS. 7A and 7B are a front view and a side view showing the other part of the armature arm, respectively.

Figure 5B:
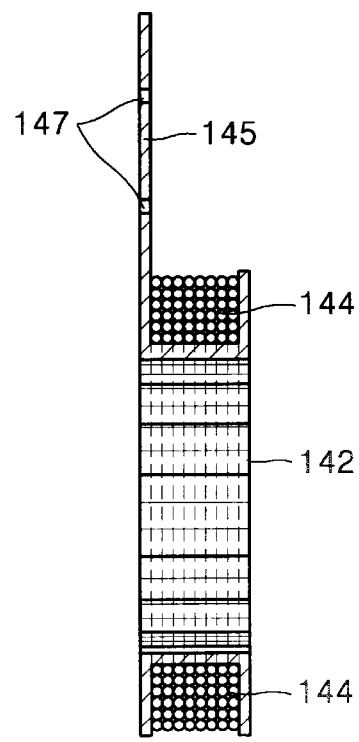
Figure 6A:
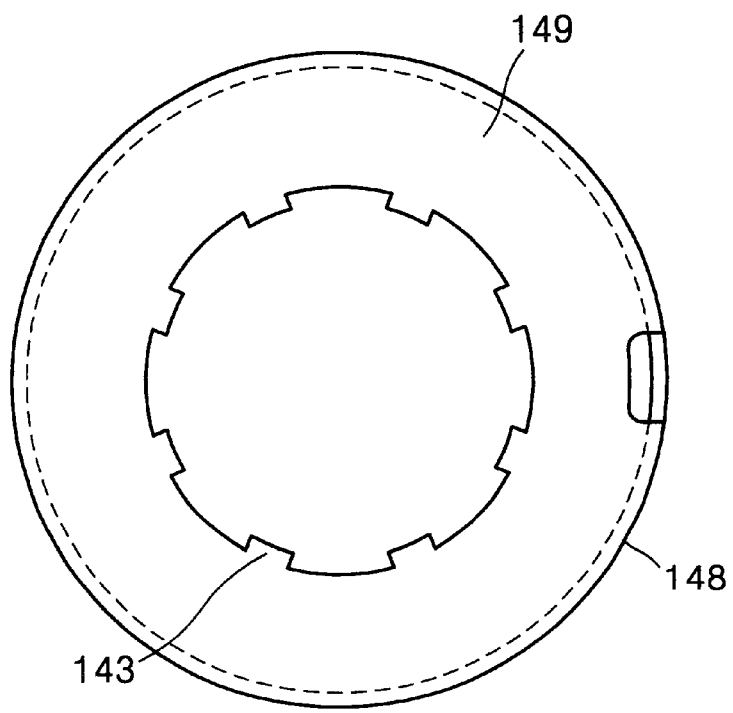
FIGS. 6A and 6B are a front view and a side view, respectively, showing a part of an armature arm.
Figure 6B:
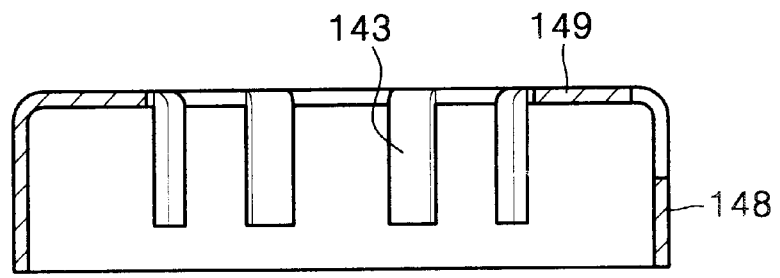

As shown in FIGS. 5A and 5B, the spool 142 in the armature coil assembly about which the armature coil 144 is wound is in the form of a spool and the protruding lead wire guiding portion 145 protruding from the spool 142 for guiding the lead wire of the armature coil to the outside is provided at the spool 142. The protruding lead wire guiding portion 145 has a protruding main body, a cover and a coupling portion 147. Also, to secure the length of the lead wire needed for connection, a constricted portion 146 about which the lead wire can be wound is preferably formed at the protruding lead wire guiding portion 145. The protruding lead wire guiding portion 145 is a tube to safely guide the lead wire to the outside. Thus, when the hub is injection-molded in a state in which the armature assembly is inserted, the very thin armature coil 144 can be prevented from being cut off or damaged and also the connection with the light-emitting device is made easy. Also, mass production of the roller skate wheel having a light emission function can be possible with only a few workers.

FIGS. 6A through 7B show the armature arm constituting the armature coil assembly. As shown in the drawings, the armature arm applied to the present invention includes two covers 148 which cover the spool 142 on both sides thereof. Each of the covers 148 has armature arms 143 perpendicularly protruding from the cover surface 149. The armature arms 143 are formed to be separated at predetermined distances and to alternate with the armature arms formed on the other cover. The reason is that, when the armature coil assembly is rotated, the cover, to which the armature arm 143 corresponding to the polarity of the permanent magnet 128 is connected, alternates repeatedly the N pole and the S pole to be electromagnetically induced so that alternating current is induced to the coil 144 of the spool 142. Each of the armature arms 143 are arranged to face the poles, which are alternately disposed along the circumference of the permanent magnet 128 (see FIG. 8A), so as to be temporarily magnetized to the polarity of a pole by the magnetic flux of the permanent magnet when the cover connected to the armature arm is rotated. Here, the magnetization polarity of the cover changes periodically as the armature coil assembly is rotated. As the covers are magnetized to different polarities and the polarities periodically alternate such that the magnetic flux can be orthogonal to the direction of coil windings, current is induced to the armature coil due to electromagnetic induction. In the above structure of the armature coil assembly, even when the direction of windings of the armature coil and the arrangement of the permanent magnet are not the same, magnetic flux perpendicular to the direction of coil windings can be formed between the armature coil assembly and the permanent magnet so that current due to the electromagnetic induction is smoothly generated.

Figure 8A:
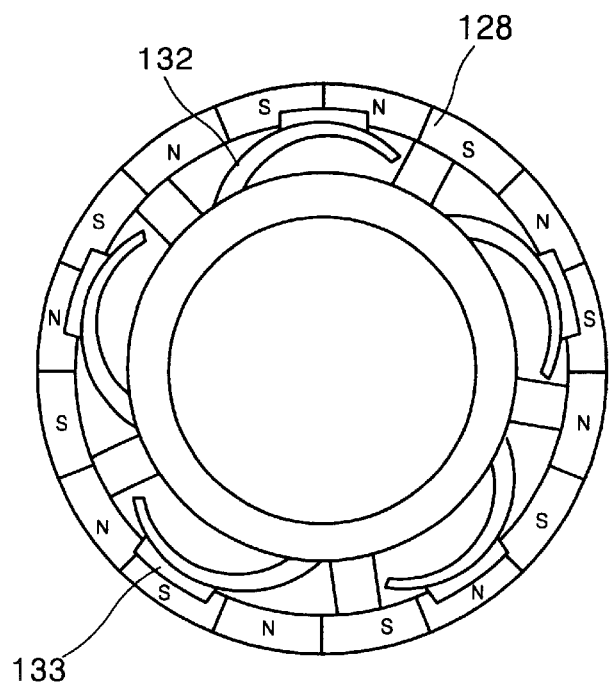
FIGS. 8A and 8B are a front view and a side view, both showing the structure of a permanent magnet assembly.
Figure 8B:
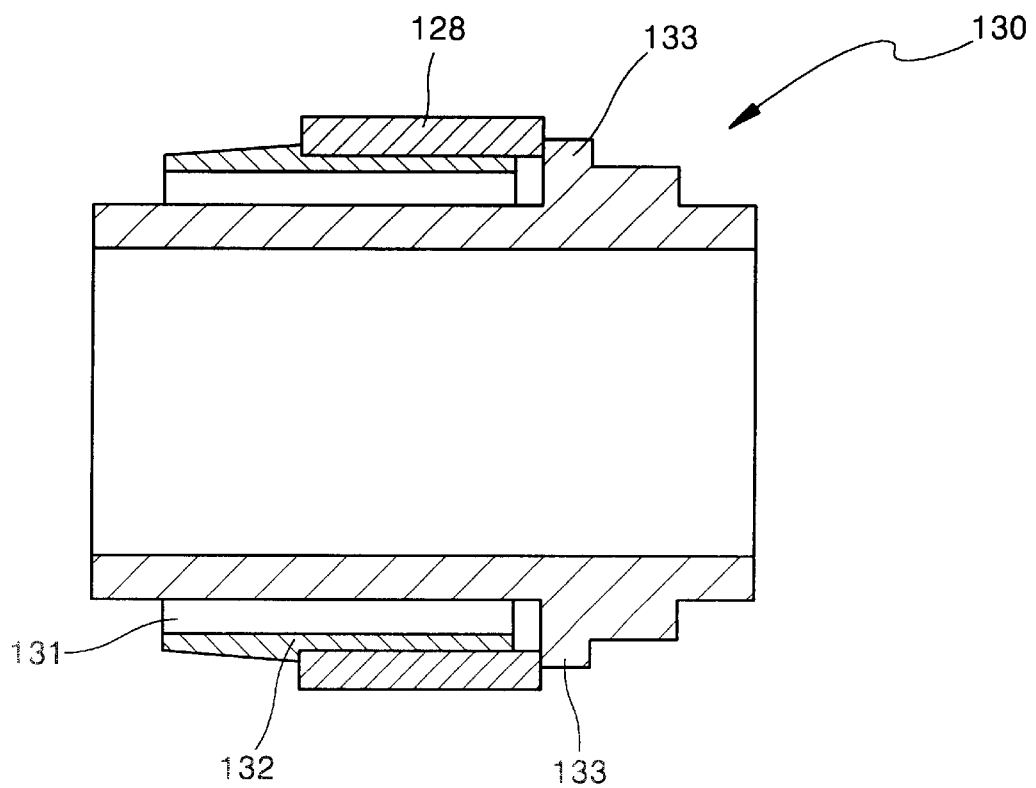

FIGS. 8A and 8B show a permanent magnet assembly applied to the present invention which has a structure that is resistive to impacts. As shown in the drawings, the permanent magnet assembly includes a buffer 130 having the buffer wings 132 formed of a material exhibiting superior elasticity formed along the circumference thereof and the permanent magnet 128 having the structure in which poles of alternating polarities are arranged along the circumference thereof and being inserted around the buffer 130. A separation prevention step 133 for preventing the permanent magnet 128 from being separated from the buffer 130 is formed on the buffer 130. As shown in the drawings, a buffer space 131 is provided between the buffer wings 132 and the permanent magnet 128 to securely buffer external impacts. Therefore, since the impacts to the permanent magnet 128 are absorbed by the buffer wings 132 in order to prevent damage to the permanent magnet, not only a ferrite based permanent magnet but also a rare-earth based permanent magnet in Lanthanides of the periodic table of elements, which exhibits a strong magnetic force but is weak against impacts, can be used. As a result, the size of the generator is reduced by ½ through ⅓ that of the conventional generator while the output thereof is improved by a factor of 3–5. Also, when the expensive rare-earth based permanent magnet is used, as the thickness of the magnet can be reduced, the cost for a magnet decreases while the economic value thereof is improved. Although five buffer wings are shown in the present embodiment, the number of the buffer wings can be appropriately designed.

Figure 9A:
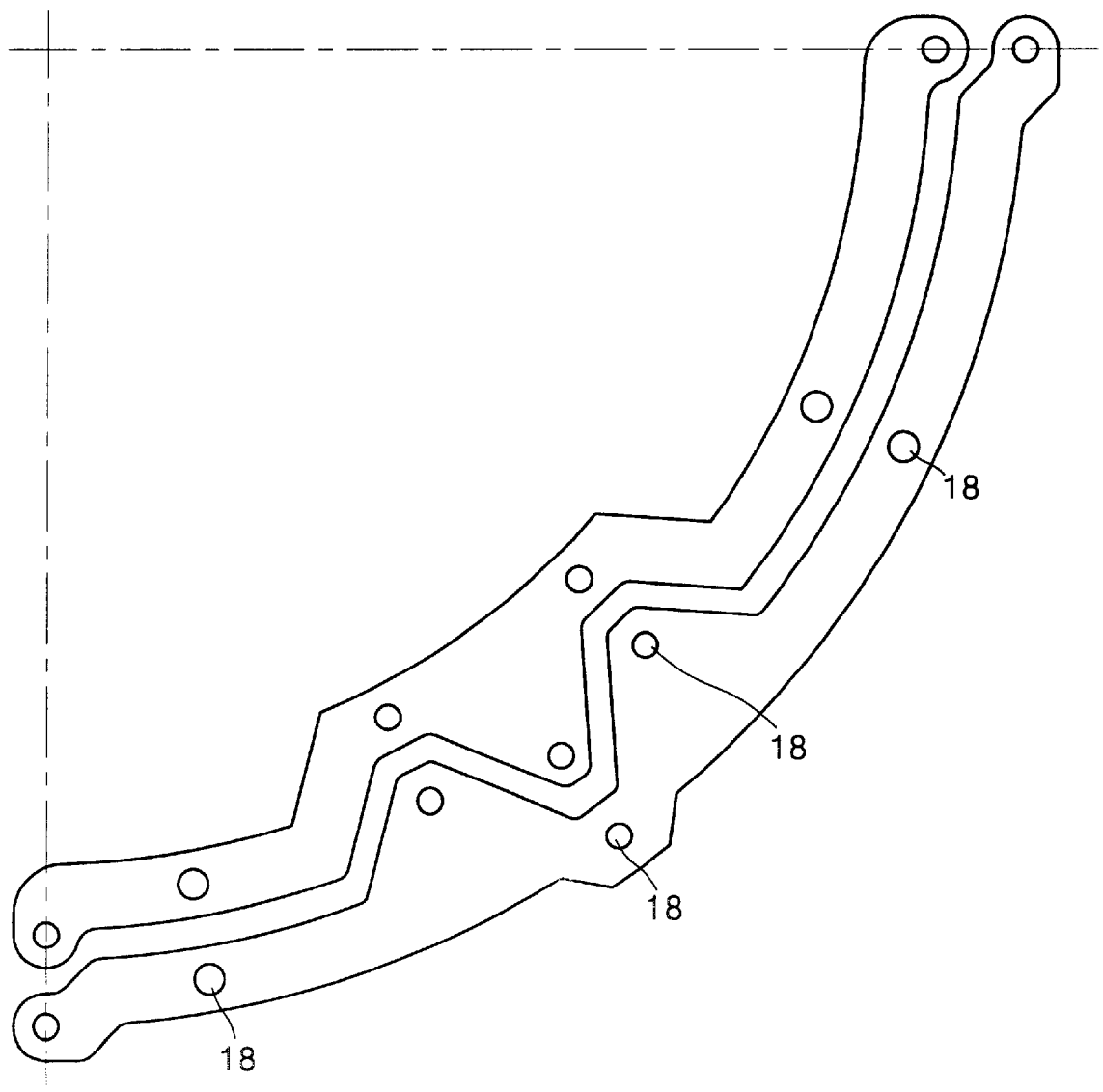
FIGS. 9A and 9B are front views showing light-emitting device installation circuit boards on which a light-emitting device and other necessary electronic circuit chips are installed, which are applied to FIGS. 2A and 2B, respectively.
Figure 9B:
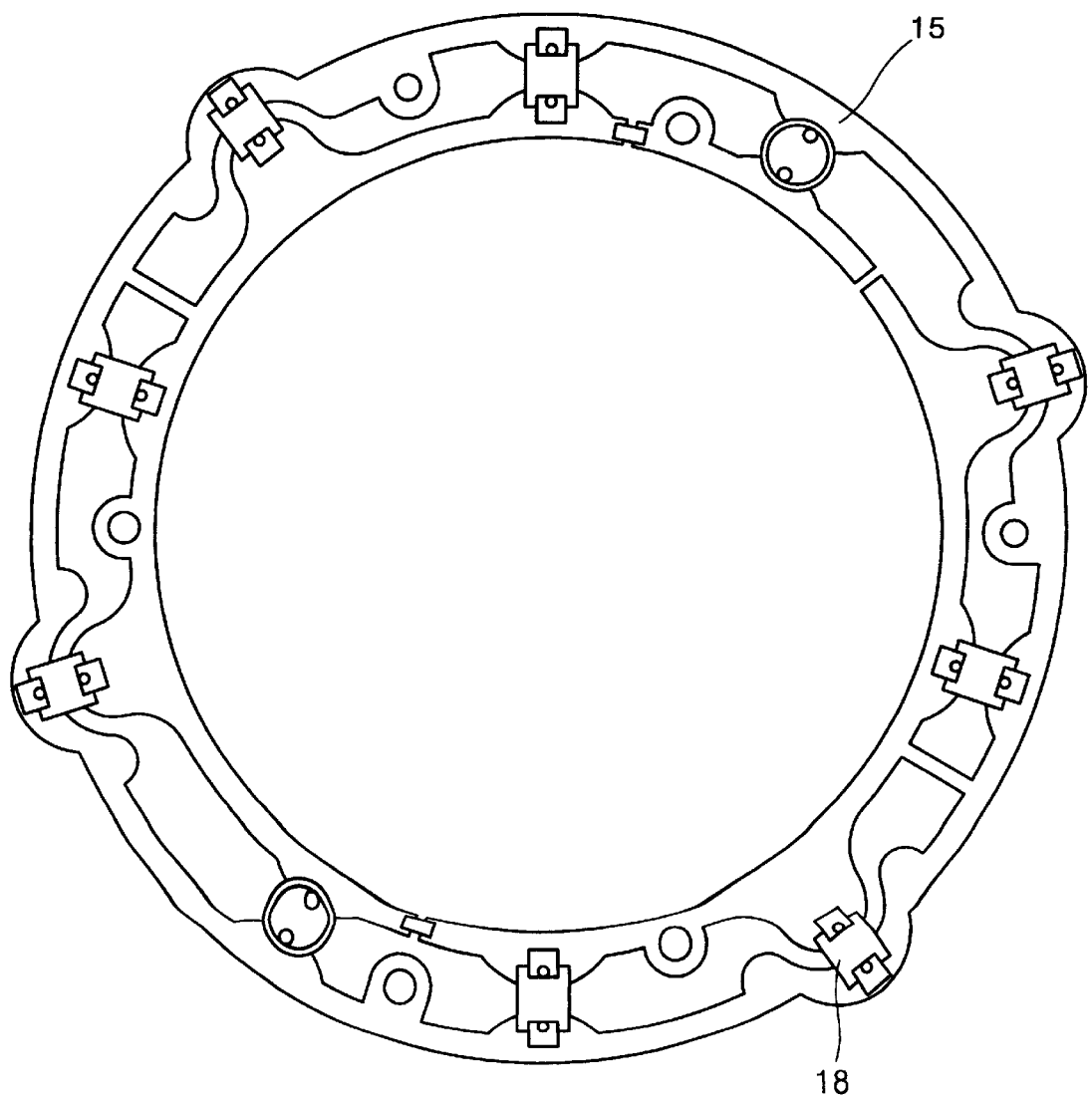

The present invention adopts a light-emitting device installation circuit board, as shown in FIGS. 9A and 9B, to improve efficiency of light emission, light emission phase adjustment and the efficiency of manufacture of a roller skate wheel employing a power generation mechanism. The light emission phase adjustment is for adjusting light rays emitted from the light-emitting devices so that they do not overlapped with one another during rotation of the wheel.

As shown in FIG. 9B, the light-emitting device installation circuit board 15 is a thin circular conductive plate on which light-emitting devices, that is, light-emitting diode (LED) chips 18 and electric elements in the present embodiment, or bulb type light-emitting devices, are mounted spaced apart by a predetermined distance and angle around the circumference thereof. However, as shown in FIG. 9A, to minimize exposure of the light-emitting device installation circuit board 15 to the outside, a thin quarter circular conductive installation plate can be installed inside the hub, that is, a user's foot. When bulb type LEDs are used, a transparent LED bulb protective cap (19 of FIG. 3A) is used. Usually, a transparent protective cap protects the LED bulb from being damaged during a urethane molding process. Further, the refractive indices of urethane resin and the LED bulb are almost the same such that the refractive indices are maintained to prevent loss of the effect of an LED lens formed at the top portion of the LED, thus maximizing the brightness of the LED light-emitting device. Also, as the operating voltage varies for LEDs of different colors, LEDs of different colors cannot be used together with a weak AC output of a compact generator unless an additional circuit is provided. However, the light-emitting device installation circuit board facilitates adjustment so that light rays emitted from the LEDs do not overlap each other and are separately emitted at a desired position during the running of the wheel. Also, the light-emitting device installation circuit board includes a control circuit for controlling light emission so that different colored LEDs can be used together. A description thereof will be omitted as it is clearly obvious to a person in the art.

In the present invention, the light-emitting devices are not additionally attached, or the lead wire of the armature coil is not manually connected to the light-emitting device. When the light-emitting device installation circuit board is press-manufactured, the light-emitting devices are mounted thereon through an automation process. As the light-emitting device installation circuit board functions as a conductive plate, the manufacturing process can be simplified by connecting the lead wire to a single light-emitting device. The light-emitting device installation circuit board makes it possible to automate wire connection of the light-emitting device and makes the assembly easy, so that mass production and productivity in manufacturing the light-emitting wheel for roller skates are promoted.

The manufacturing process of the roller skate wheel according to the preferred embodiments of the present invention relates to a method of mass production of the improved compact generator having the above structure and the roller skate wheels adopting the same. In the method of manufacturing roller skate wheels adopting conventional light-emitting mechanisms, the structure of a generator is complicated and the size thereof is very large and heavy, as described above, so that efficiency of power generation is low. Also, the processes of mounting the light-emitting devices and connection of the lead wire between the armature coil and the light-emitting device are considerably complicated, thereby lowering work efficiency and hindering mass production thereof.

According to the manufacturing method of the light-emitting wheel for roller skates according to the present invention, parts included in the wheel axle assembly, i.e., the bearing spacer, which has a unique structure, the permanent magnet assembly, the armature coil assembly, the bearings and the bushing are separately manufactured and other wheel hub assembly and the light-emitting device installation circuit board are separately manufactured. As the roller skate wheel is manufactured with the prepared parts, the manufacturing process is made easy and simplified. Each step of the manufacturing process will now be described in detail.

First, a separately manufactured permanent magnet and buffer are prepared. The permanent magnet is inserted around the buffer having buffer wings for absorbing impact to the permanent magnet so that the permanent magnet assembly is formed.

Also, as in the above step, separately manufactured armature coil spool and armature arms are prepared. The armature coil assembly having the protruding lead wire guiding portion for guiding the lead wire of the armature coil to the outside, in which the armature arms are alternately protruding from the covers encompassing both sides of the spool where the armature coil is installed, is formed.

Next, the armature coil assembly inserted in the hub is injection-molded together so that the hub integrally formed with the armature coil assembly is manufactured. The thin conductive plate where the light-emitting devices are installed is placed on the outer frame of the wheel hub. The lead wire coil from the armature coil assembly is connected to one of the light-emitting devices. A mold for a urethane tire to be fixed at the outer frame of the wheel hub is formed. The wheel hub is inserted in the mold and transparent liquid polyurethane resin is injected and cured to form a wheel. When the polyurethane is cured, the mold is removed so that a wheel is formed. The bearing spacer, the permanent magnet assembly, the bearings and the busing are sequentially inserted through one side of the wheel hub where the armature coil assembly is molded.

When the bearings and bushing are sequentially inserted in the wheel through the other side of the hub where the armature coil assembly is molded, a desired light-emitting wheel of a roller skate can be obtained. Here, as the wheel axle is usually supplied according to the specifications of roller skate manufacturing companies, the wheel can be supplied without the wheel axle. However, when the wheel is supplied with the wheel axle, the wheel is completed by coupling both sides of the axle with bolts. If a bolt head portion is formed at one end of the axle so that the axle cannot escape, only one side of the inner surface of the axle is to be threaded so that the bolt is coupled to fix it.

As described above, in the improved compact generator, the roller skate wheel having the same, and a manufacturing method according to the present invention, the structure of the permanent magnet assembly and the armature coil assembly is improved so that a rare-earth based permanent magnet in Lanthanides of the periodic table of the elements, exhibiting a strong magnetic force, which was not used due to its weak impact resistance in the conventional technology can be used, electromagnetic induction is efficiently performed, and a compact structure thereof is possible. Also, the structure of the permanent magnet assembly is improved so that the feature of anti-shock is superior, thereby securing high reliability. Thus, even when a generator is included in a wheel such as an in-line skate having a small inside space, mechanical stability and movability which are very important points in manufacturing wheels are not lowered, and efficient light emission and mass production is possible due to the improved structure of the armature coil assembly and the light-emitting device installation circuit board. Further, any axle having a different diameter and length according to the specifications of a roller skate can be used by the support of the distinct bearing spacer so that the wheel axle attached to or provided at the roller skate can be used without actually supplying the wheel axle to a user.

What is claimed is:

1. A wheel generator for generating electricity according to the rotation of a wheel, said wheel generator comprising:
   a wheel axle;
   two bearings, each comprising a ring type inner part fixed to said wheel axle and surrounding said wheel axle and a ring type outer part which surrounds said inner part and is rotatable around said wheel axle, in which balls are interposed between said inner part and said outer part;
   a ring type permanent magnet assembly comprising a ring type permanent magnet fixedly installed surrounding the wheel axle, in which a permanent magnet is fixed and the permanent magnet having poles of alternating polarities alternately arranged in a circumferential direction;
   a ring type armature coil assembly which rotates together with the outer parts of said bearings so that electricity is generated by rotational movement of the ring type armature coil assembly with respect to said permanent magnet assembly; and
   a hub assembly surrounding and fixedly supporting the armature coil assembly, and having a throughhole formed in the center thereof, in which the two bearings are fitted into a respective side of the throughhole,
   wherein said permanent magnet assembly is attachably and detachably installed in a space between the positions where the bearings are installed through the respective sides of the throughhole in the hub assembly, and
   wherein said permanent magnet assembly further comprises a buffer means installed between said wheel axle and said permanent magnet to protect the permanent magnet from impact.

2. The wheel generator as claimed in claim 1, wherein said buffer means further comprises: a plurality of protruding buffer wings protruding around the circumference thereof for more effectively absorbing impact applied to said permanent magnet during running of said wheel.

3. The wheel generator as claimed in claim 1, wherein said ring type armature coil assembly comprises a protruding guide tube for guiding two lead wires extending from said armature coil assembly to the outside and protecting said lead wires from being damaged.

4. The wheel generator as claimed in claim 2, wherein said ring type armature coil assembly comprises a protruding guide tube for guiding two lead wires extending from said armature coil assembly to the outside and protecting said lead wires from being damaged.

5. A light-emitting wheel generating electricity and performing a light-emitting function during rotation of the wheel, said wheel comprising:
   a wheel axle;
   two bearings, each comprising a ring type inner part fixed to said wheel axle and surrounding said wheel axle and a ring type outer part which surrounds said inner part and is rotatable around said wheel axle, in which balls are interposed between said inner part and said outer part;
   a ring type permanent magnet assembly comprising a ring type permanent magnet fixedly installed surrounding the wheel axle in which a permanent magnet is fixed and the permanent magnet having poles of alternating polarities alternately arranged in a circumferential direction;
   a ring type armature coil assembly which rotates together with the outer parts of said bearings so that electricity is generated by rotational movement of the ring type armature coil assembly with respect to said permanent magnet assembly;
   a hub assembly surrounding and fixedly supporting the armature coil assembly, and having a throughhole in the center thereof, in which the two bearings are fitted into a respective said of the throughhole; and
   one or more light-emitting devices, each for performing a light-emitting function using the electricity generated in said armature coil assembly,
   wherein said light-emitting wheel further comprises a light-emitting device installation circuit board on which a plurality of holes which are formed to be distant from each other by a predetermined interval so that light beams from at least two light-emitting devices are not mixed with each other but separated from each other, through which the lead wires of the light-emitting devices can be inserted to easily install the light-emitting devices.

6. The light-emitting wheel of claim 5, wherein said permanent magnet assembly is attachably and detachably installed in a space between the positions where the bearings are stalled through the respective sides of the throughhole in the hub assembly, and
   wherein said permanent magnet assembly further comprises a buffer means installed between said wheel axle and said permanent magnet to protect the permanent magnet from impact.

7. The light-emitting wheel as claimed in claim 5, wherein said ring type armature coil assembly comprises a protruding guide tube for guiding two lead wires extending from said armature coil assembly to the outside and protecting said lead wires from being damaged.

8. The light-emitting wheel as claimed in claim 5, wherein said one or more light-emitting devices are light-emitting diodes mounted on the surface of said light-emitting device installation circuit board, or bulb type LED lamps which are fixedly inserted into respective socket grooves formed on the front side of the hub and whose lead wires are connected to said light-emitting device installation circuit board.

9. The light-emitting wheel as claimed in claim 8, further comprising a transparent bulb protection cap if said light-emitting device is a bulb type LED lamp.

10. A method for manufacturing a light-emitting wheel having a light-emitting mechanism in which electricity is generated by rotation of the wheel, said method comprising the steps of:

forming a permanent magnet assembly having a buffer means to protect a ring type permanent magnet from impact;

forming an armature coil assembly in which an armature coil is wound around an armature coil spool enclosed within two half covers having armature arms alternately protruding from each half cover, and two lead wires are extended from the armature coil to the outside to be connected to at least one light-emitting device;

inserting said armature coil assembly into a wheel hub and injection-molding the wheel hub;

installing a thin conductive plate on which at least one light-emitting device is installed at said wheel hub;

connecting the two lead wires from said armature coil assembly to said at least one light-emitting device;

inserting said wheel hub into a mold and injecting transparent liquid polyurethane resin into the mold whereby a polyurethane tire is injection-molded to be fixed to said wheel hub;

separating said mold when said polyurethane is cured;

fitting said wheel with said permanent magnet assembly; and fitting said wheel hub with one or more bearings, to thereby form a wheel.

11. The wheel generator as claimed in claim 1, wherein said ring type permanent magnet is a rare-earth based permanent magnet.

12. The light-emitting wheel as claimed in claim 5, wherein said ring type permanent magnet is a rare-earth based permanent magnet.

13. The light-emitting wheel as claimed in claim 5, wherein said light-emitting wheel is adopted in either one of roller skates, in-line skates, skate boards, bound skates, kick boards, bicycles, tricycles, scooters, motor cycles, and any toys provided with wheels.

14. The light-emitting wheel as claimed in claim 6, wherein said buffer means in said ring type permanent magnet assembly further comprises: a plurality of protruding buffer wings arranged around the circumference thereof for more effectively absorbing impact.

15. The light-emitting wheel as claimed in claim 6, wherein said light-emitting device installation circuit board is formed of a thin cunductive plate.

16. The wheel generator as claimed in claim 2, wherein said ring type permanent magnet is a rare-earth based permanent magnet.

17. The light-emitting wheel as claimed in claim 6, wherein said ring type permanent magnet is a rare-earth based permanent magnet.

18. The light-emitting wheel as claimed in claim 6, wherein said light-emitting wheel is adopted in either one of roller skates, in-line skates, skate boards, bound skates, kick boards, bicycles, tricycles, scooters, motor cycles, and any toys provided with wheels.

19. A wheel generator for generating electricity according to the rotation of a wheel, said wheel generator comprising:

a ring type permanent magnet assembly in the center of which a wheel axle throughhole is formed to enable a wheel axle to penetrate, comprising a ring type permanent magnet fixedly installed surrounding the wheel axle and contacting inner parts of two bearings installed at either side of the ring type permanent magnet assembly, each bearing having a wheel axle throughhole, in which poles of alternating polarities of the permanent magnet alternately arranged in a circumferential direction;

a ring type armature coil assembly which rotates together with the outer parts of said two bearings so that electricity is generated by rotational movement of the ring type armature coil assembly with respect to said permanent assembly; and a hub assembly surrounding and fixedly supporting the armature coil assembly, and having a throughhole formed in the center thereof, in which the two bearings are fitted into a respective side of the throughhole, wherein said permanent magnet assembly is attachably and detachably installed in a space between the positions where the bearings are installed through the respective sides of the throughhole in the hub assembly, and wherein said permanent magnet assembly further comprises a buffer means installed between said wheel axle and said permanent magnet to protect the permanent magnet from impact.

20. The wheel generator as claimed in claim 19, wherein said buffer means further comprises: a plurality of buffer wings protruding around the circumference thereof for more effectively absorbing impacts applied to said permanent magnet during running of said wheel.

21. The wheel generator as claimed in claim 19, wherein said ring type armature coil assembly comprises a protruding guide tube for guiding two lead wires extending from said armature coil assembly to the outside and protecting said lead wires from being damaged.

22. The wheel generator as claimed in claim 19, wherein said ring type permanent magnet is a rare-earth based permanent magnet.

23. A light-emitting wheel generating electricity and performing a light-emitting function during rotation of the wheel, said wheel comprising:

a ring type permanent magnet assembly in the center of which a wheel axle throughhole is formed to enable a wheel axle to penetrate, comprising a ring type permanent magnet fixedly installed surrounding the wheel axle and contacting inner parts of two bearings installed at either side of the ring type permanent magnet assembly, each bearing having a wheel axle throughhole, in which poles of alternating polarities of the permanent magnet alternately arranged in a circumferential direction;

a ring type armature coil assembly which rotates together with the outer parts of said two bearings so that electricity is generated by rotational movement of the ring type armature coil assembly with respect to said permanent assembly;

a hub assembly surrounding and fixedly supporting the armature coil assembly, and having a throughhole formed in the center thereof, in which the two bearings are fitted into a respective side of the throughhole, and one or more light-emitting devices, each for performing a light-emitting function using the electricity generated in said armature coil assembly, wherein said light-emitting wheel further comprises a light-emitting device installation circuit board on which a plurality of holes which are formed to be distant from each other by a predetermined interval so that light beams from at least two light-emitting devices are not mixed with each other but separated from each other, through which the lead wires of the light-emitting devices can be inserted to easily install the light-emitting devices.

24. The light-emitting wheel as claimed in claim 23, wherein said permanent magnet assembly is attachably and detachably installed in a space between the positions where the bearings are installed through the respective sides of the throughhole in the hub assembly, and wherein said permanent magnet assembly further comprises a buffer means installed between said wheel axle and said permanent magnet to protect the permanent magnet from impact.

25. The wheel generator as claimed in claim 24, wherein said buffer means further comprises: a plurality of buffer wings protruding around the circumference thereof for more effectively absorbing impacts applied to said permanent magnet during running of said wheel.

26. The light-emitting wheel as claimed in claim 23, wherein said light-emitting device installation circuit board is formed of a thin conductive plate.

27. The light-emitting wheel as claimed in claim 23, wherein said ring type armature coil assembly comprises a protruding guide tube for guiding two lead wires extending from said armature coil assembly to the outside and protecting said lead wires from being damaged.

28. The light-emitting wheel as claimed in claim 23, wherein said one or more light-emitting devices are light-emitting diodes mounted on a surface of said light-emitting device installation circuit board, or bulb type LED lamps which are fixedly inserted into a respective socket groove formed on the front side of the hub and whose lead wires are connected to said light-emitting device installation circuit board.

29. The light-emitting wheel as claimed in claim 28, further comprising a transparent bulb protection cap if said light-emitting device is a bulb type LED lamp.

30. The wheel generator as claimed in claim 24, wherein said ring type permanent magnet is a rare-earth based permanent magnet.

31. The light-emitting wheel as claimed in claim 23, wherein said light-emitting wheel is adopted in either one of roller skates, in-line skates, skate boards, bound skates, kick boards, bicycles, tricycles, scooters, motor cycles, and any toys provided with wheels.

* * * * *